United States Patent [19]

Mage et al.

[11] 4,339,543

[45] Jul. 13, 1982

[54] TEMPERATURE-STABLE DIELECTRIC MATERIAL FOR USE AT VERY HIGH FREQUENCY AND A METHOD OF MANUFACTURE OF SAID MATERIAL

[75] Inventors: Jean-Claude Mage; Claude Deljurie, both of Paris, France

[73] Assignee: Thomson-CSF, Paris, France

[21] Appl. No.: 237,935

[22] Filed: Feb. 25, 1981

[30] Foreign Application Priority Data

Feb. 29, 1980 [FR] France .................................. 80 04601

[51] Int. Cl.$^3$ .............................................. C04B 35/46
[52] U.S. Cl. ....................................... 501/134; 264/65; 264/332
[58] Field of Search ........................................ 501/134

[56] References Cited

U.S. PATENT DOCUMENTS 3,639,132 2/1972 Egerton ............................... 501/134
4,102,696 7/1978 Katsube et al. ...................... 501/134

FOREIGN PATENT DOCUMENTS 2634145 7/1976 Fed. Rep. of Germany ...... 501/134
1418388 11/1964 France .

*Primary Examiner*—Helen M. McCarthy
*Attorney, Agent, or Firm*—Oblon, Fisher, Spivak, McClelland & Maier

[57] ABSTRACT

A dielectric material having a high dielectric constant, very low high-frequency losses and very high temperature stability is prepared in particular by sintering previously ground raw materials in an oxidizing atmosphere at 1450° C. The molar composition of the raw materials is as follows: t, $TiO_2$; x, $SnO_2$; y, $ZrO_2$; a, NiO; b, $La_2O_3$; where t is between 0.9 and 1.1, x is between 0.1 and 0.4 moles, y is between 0.6 and 0.9, a is between 0.015 and 0.06 moles, b is between 0.01 and 0.1 moles with an addition of iron of 0.0035 mole in respect of one mole of $TiO_2$ obtained, for example, from the use of steel equipment for the grinding operation. When x is in the vicinity of 0.35, the coefficient of thermal variation $\tau_f$ is reduced to zero and the quality criterion Q.f is high.

8 Claims, 3 Drawing Figures

TEMPERATURE-STABLE DIELECTRIC MATERIAL FOR USE AT VERY HIGH FREQUENCY AND A METHOD OF MANUFACTURE OF SAID MATERIAL

This invention relates to a temperature-stable dielectric material having a high dielectric constant and very low losses, thus making it suitable for the fabrication of dielectric resonators designed for operation at frequencies above 1 gigahertz and especially for the construction of filters and oscillators.

As taught in particular in studies carried out by Richtmeyer and published in 1939 in the Journal of Applied Physics, vol. 10, No 6, page 391, in an article entitled "Dielectric Resonators", it is known that an enclosure occupied by a solid dielectric can behave as a resonant cavity at very high frequency. The wavelength of the electromagnetic oscillations is shorter as the dielectric constant of the medium is of higher value.

It is also known to make use of materials of the diagram $TiO_2$, $ZrO_2$, $SnO_2$, $ZnO$ having the following properties:
- relative dielectric constant within the range of 30 to 40;
- tangent of the dielectric loss angle within the range of $2 \times 10^{-4}$ to $4 \times 10^{-4}$;
- temperature coefficient of the dielectric constant within the range of $-10 \times 10^{-6}/°C$ to $+50 \times 10^{-6}/°C$.

The construction of temperature-stable resonators of this type by means of materials mentioned in the foregoing has also been described in the literature.

However, the dielectric losses are greater as the frequency is higher, especially within the range of 2 to 100 GHz. A quality criterion can be defined by forming the product $$Q f$$

where f is the frequency in gigahertz and Q is defined by the relation:

$$Q = \frac{1}{tg\delta}$$

where $tg\delta$ is the tangent of the loss angle.

In the case of a frequency of 8 GHz, the product Qf is of the order of 30,000 to 40,000 in the case of temperature-stable materials.

The aim of the invention is to improve the quality criterion by increasing the product Qf within the 2–100 Ghz band without affecting the temperature stability.

The dielectric material in accordance with the invention is fabricated by the ceramics technology in a series of steps including in particular a step which involves sintering of previously ground raw materials in an oxidizing atmosphere.

The material is distinguished by the fact that the relative molar proportions of the starting materials are defined by the following composition: t, $TiO_2$; x, $SnO_2$; y, $ZrO_2$; a, $NiO$; b, $La_2O_3$ and c, Fe where the parameters t, x, y, a, b, and c satisfy the following inequalities:

$$0.9 \leq t \leq 1.1$$
$$0.1 \leq x \leq 0.4$$
$$0.6 \leq y \leq 0.9$$
$$0.015 \leq a \leq 0.06$$
$$0.01 \leq b \leq 0.1$$
$$0.001 \leq c \leq 0.01$$

The materials having the highest temperature stability are obtained by:

$$0.99 \leq t \leq 1.01$$
$$0.30 \leq x \leq 0.38$$
$$0.60 \leq y \leq 0.70$$
$$0.015 \leq a \leq 0.06$$
$$0.01 \leq b \leq 0.1$$
$$0 \leq c \leq 0.0035$$

These and other features of the invention will be more apparent upon consideration of the following description and accompanying drawings, wherein.

Figure 1:
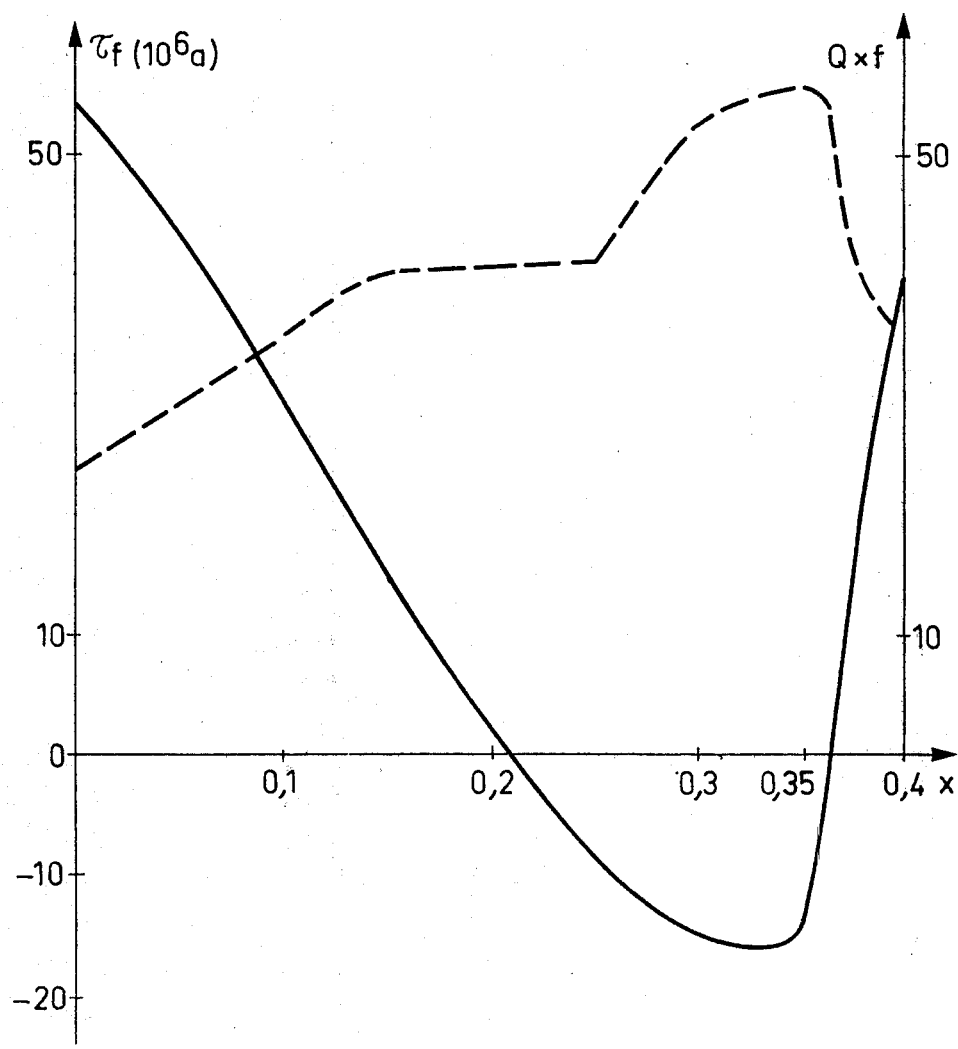
FIG. 1 is a graph illustrating the influence of the composition on the operating parameters of a dielectric resonator which is constructed of material in accordance with the invention.

In the graph of FIG. 1, the molar percentage of stannic oxide with respect to the number of moles of titanium oxide has been plotted as abscissae. There is shown on a first scale of ordinates a parameter $\tau_f$ defined hereinafter and expressing the temperature-dependent first-order drift of the resonance frequency of the material in respect of each composition corresponding to the axis of abscissae x. In fact, the series development, limited to the first two terms of the relative drift of the resonance frequency f is as follows:

$$\frac{f - f_o}{f_o} = 1 + A(T - T_o) + B(T - T_o)^2 \quad (1)$$

where $f_o$ is the resonance frequency at the temperature $T_o$ of 25° C.

The parameter plotted as ordinates is in fact:

$$\tau_f = 10^6 \cdot A$$

There is shown on a second scale of ordinates the quality criterion Qf in which Qf is expressed in terahertz ($10^{12}$ Hz).

Since the measurement frequency is 8 GHz and the parameters x, a, b and c are those which have been defined in connection with the composition of the material, the following values are established in the case of the graph of FIG. 1:

$$0.1 \leq x \leq 0.4$$
$$a = 0.3$$
$$b = 0.015$$
$$c = 0$$

It is noted that the parameter $\tau_f$ is reduced to zero in respect of two values of x: one value is in the vicinity of 0.20 whilst the other value is in the vicinity of 0.35 (the coefficient b of relation (1) remains of the order of $-0.05 \times 10^{-6}/°C$. However, it is noted that the quality criterion is very distinctly better in the case of x=0.35 than in the case of x=0.20.

When the frequency of the resonator is different from 8 GHz, similar curves are obtained. However, in the case of resonators having dimensions adapted to different resonance frequencies, the following differences are found in the same mode:

20% in the case of a 2-GHz resonator;
±10% of fluctuation between 8 and 100 GHz.

The method of fabrication of the material in accordance with the invention involves the following steps which are similar to those of production of ceramic materials:

(a) mixing of the starting materials after preliminary weighing, with the exception of iron which may subsequently be obtained from the use of steel balls in the following step;

(b) first grinding in an aqueous or alcohol medium by means of zirconia or steel balls. Should it be desired to introduce iron, for example, 10,000 steel balls 3 mm in diameter are employed per 100 grams of starting materials within a porcelain vessel containing half a liter of ethyl alcohol. The grinding time is 20 minutes in order to obtain a quantity of the order of 0.003 mole of iron in respect of one mole of titanium oxide;

(c) calcining in a pure oxygen atmosphere for a period of six hours at a temperature within the range of 1150° C. to 1250° C. and preferably at 1200° C.; in the case of grinding with steel balls, this step can be eliminated without any difficulty;

(d) second grinding operation performed by subjecting the calcined powder to the same treatment as in step (b); this step is dispensed with in the event that step (c) is dispensed with;

(e) sintering in a pure oxygen atmosphere for a period of six hours at a temperature within the range of 1400° C. to 1500° C. and preferably at 1450° C.

EXAMPLES

Examples 1 to 4 (Table 1) relate to initial compositions in which x is in the vicinity of 0.35; Examples 5 to 10 (Table 2) relate to the case in which x is in the vicinity of 0.20.

TABLE 1

| | | | (d is the density of the sintered material) | | | | | |
|---|---|---|---|---|---|---|---|---|
| No | x | y | t | a | b | c | $\tau_f$ | Q.f (THz) | d |
| 1 | 0.35 | 0.65 | 1 | 0.03 | 0.015 | 0 | −12 | 56 | 5.21 |
| 2 | 0.37 | 0.63 | 1 | 0.03 | 0.015 | 0 | +21 | 38 | 5.09 |
| 3 | 0.325 | 0.642 | 1.003 | 0.03 | 0.015 | 0.0035 | +3 | 49 | 5.19 |
| 4 | 0.325 | 0.644 | 1.005 | 0.03 | 0.015 | 0.0035 | 0 | 50 | 5.21 |

TABLE 2

| No | x | y | t | a | b | c | $\tau_f$ | Q.f (THz) | d |
|---|---|---|---|---|---|---|---|---|---|
| 5 | 0.25 | 0.75 | 1 | 0.03 | 0.015 | 0.0035 | 0 | 46 | 5.26 |
| 6 | 0.20 | 0.80 | 1 | 0.03 | 0.015 | 0 | +2 | 38 | 4.97 |
| 7 | 0.20 | 0.80 | 1 | 0 | 0 | 0 | −3 | 12 | 4.60 |
| 8 | 0.21 (1) | 0.80 | 0.99 | 0.03 | 0.015 | 0 | +2 | 38 | 5.00 |
| 9 | 0.19 (2) | 0.80 | 1.01 | 0.03 | 0.015 | 0 | +19 | 36 | 5.05 |
| 10 | 0.25 | 0.75 | 1 | 0.03 | 0.015 | 0 | −8 | 40 | 5.06 |

In order to study the effect of different combinations of starting materials, the following materials have been produced. Table 3 gives the results for a certain number of additions to an initial composition (Example 11):

$$TiO_2; 0.3\ SnO_2; 0.7\ ZrO_2 \qquad (2)$$

TABLE 3

| Example No | Additions (in moles) | $\tau_f$ | Q.f THz | d |
|---|---|---|---|---|
| 11 | Nil | −12 | 28 | 4.92 |
| 12 | 0.03 NiO | −11 | 28 | 4.57 |
| 13 | 0.052 ZnO | −13 | 35 | 5.08 |
| 14 | 0.03 NiO + 0.052 ZnO | −15 | 41 | 5.11 |
| 15 | 0.03 NiO + 0.026 ZnO | −13 | 28 | 5.10 |
| 16 | 0.03 NiO + 0.077 ZnO | −16 | 40 | 5.07 |
| 17 | 0.03 NiO + 0.1 MgO | −20 | 47 | 5.12 |
| 18 | 0.03 NiO + 0.075 CoO | −14 | 50 | 5.08 |
| 19 | 0.06 CoO + 0.052 ZnO | −17 | 32 | 5.02 |
| 20 | 0.03 NiO + 0.015 La$_2$O$_3$ | −15 | 53 | 5.15 |
| 21 | 0.03 NiO + 0.15 La$_2$O$_3$ | +1 | 34 | 5.05 |

Figure 2:
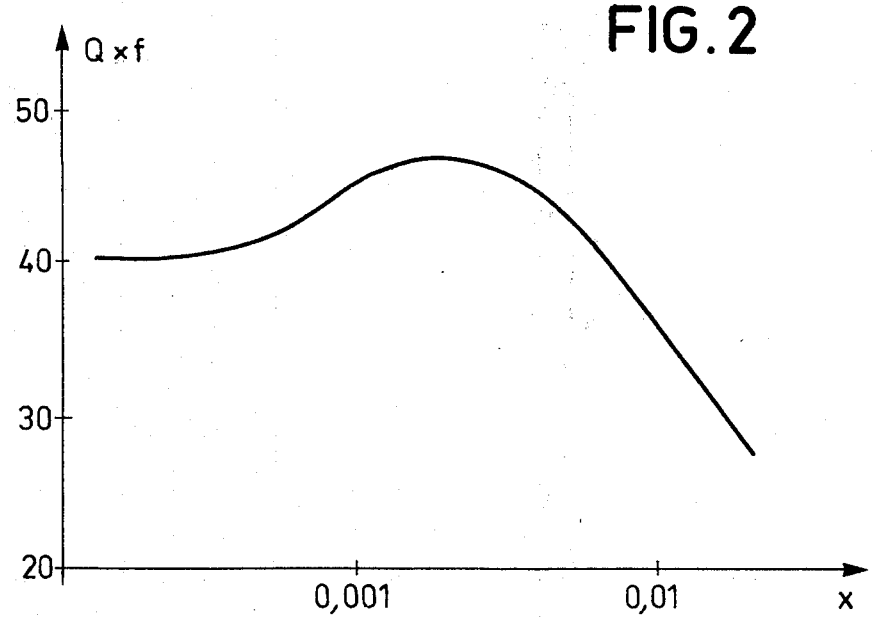
FIG. 2 is a graph showing the influence of iron on the quality criterion of a material in accordance with the invention.

In FIG. 2, the parameter t which gives the number of moles of Fe$_2$O$_3$ in the end product in respect of one mole of TiO$_2$ has been plotted as abscissae on a logarithmic scale. The quality criterion Q.f in terahertz in the case of a material having a composition given by the foregoing formula (2) has been plotted as ordinates. The maximum value of the curve corresponds to a proportion of 0.25% by weight of iron in the initial mixture.

Figure 3:
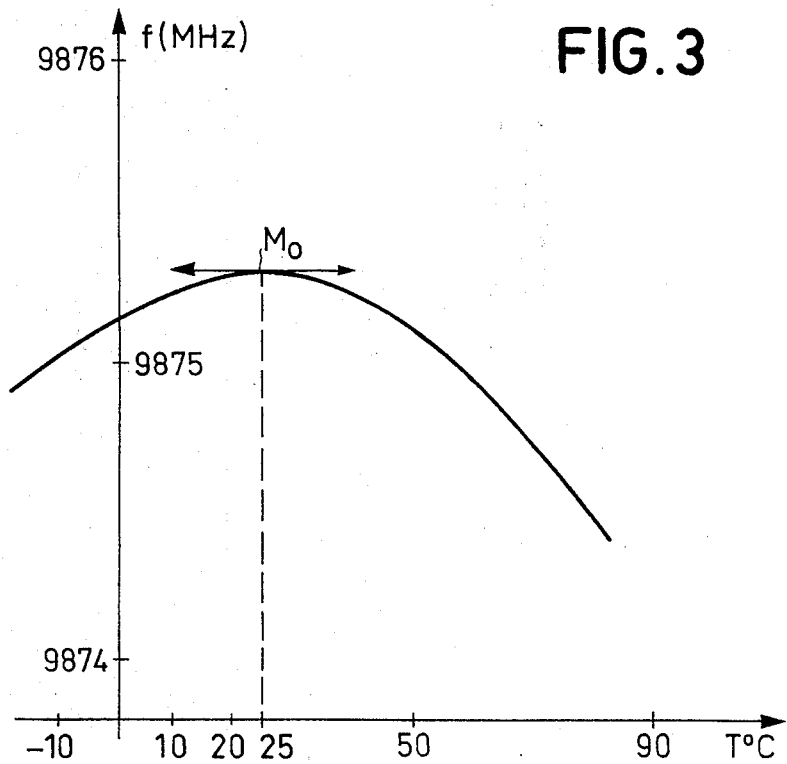
FIG. 3 is a curve of resonance frequency as a function of temperature.

In FIG. 3, there is shown the variation in resonance frequency of a sample of material on each side of the point $M_o$ of abscissae $T_o$ (25° C.). It is observed tht the coefficient b of the formula (1) given above is negative and of the order of $2 \times 10^{-5}$.

The following observations can also be made:

(1) Nickel can be incorporated in the pure state and not in the form of oxide in the starting materials (in the proportion of y, Ni$_2$ in respect of one mole of TiO$_2$). The material obtained is very homogeneous and its properties are readily reproducible.

(2) The use of jars and steel balls for the grinding operation constitutes a convenient and inxpensive solution while also making it possible to avoid contamination with the alumina produced by balls of corundum; the presence of alumina which has been introduced in this manner is liable to lower the quality criterion by about ten terahertz for example in case No. 20 (Table 3).

(3) Alumina contamination of the material during sintering must also be avoided since it is liable to lower the quality criterion to a value below 20 terahertz. This makes it necessary to employ other refractory materials without alumina.

(4) The suppression of the steps involving calcining and the second grinding operation when using steel grinding equipment not only permits an economy of means but results in a quality of the same order and sometimes even higher.

(5) An addition of 0.25% by weight of iron, namely approximately 0.4% of moles of Fe$_2$O$_3$ in respect of one mole of TiO$_2$, corresponds to an excellent value of Q.f and to a displacement of the $\tau_f$ curve towards the increasing abscissae in FIG. 1. The result thereby achieved is that, in the case of the points of intersection with the axis Ox (especially the second point of intersection), there is thus observed a product Q.f of higher value and therefore better quality in respect of a zero temperature coefficient (in the first order).

(6) The stoichiometric difference in $TiO_2$ has little effect on the results obtained in the event of an insufficiency of this latter whereas the results are very appreciably affected in the event of an excess. Excellent reproducibility of the properties of the material may therefore be sought by adopting a slight insufficiency of $TiO_2$. In practice, a reproducibility of $\tau_f$ of the order of $10^{-6}$ is observed with a degree of accuracy of $5 \times 10^{-3}$ in the relative proportions of starting materials; this corresponds to a tolerance which can readily be complied with in practice. An accuracy of $10^{-4}$ in the weighing of starting materials can be maintained in order to attain the point of $\tau_f$ which is practically zero in the vicinity of $x=0.35$.

The invention is applicable to dielectric resonators employed for the construction of very-high-frequency oscillators and filters.

What is claimed is:

1. Dielectric material of the type obtained in accordance with the ceramic production technology, comprising at least one step involving sintering of previously ground raw materials in an oxidizing atmosphere, wherein the relative molar proportions of the raw materials are as follows:

t, $TiO_2$; x, $SnO_2$; y, $ZrO_2$; a, NiO; b, $La_2O_3$ and c, Fe, in which the parameters t, x, y, a, b and c satisfy the following inequalities:

| | | |
|---|---|---|
| 0.9 | $\leq t \leq$ | 1.1 |
| 0.1 | $\leq x \leq$ | 0.4 |
| 0.6 | $\leq y \leq$ | 0.9 |
| 0.015 | $\leq a \leq$ | 0.06 |
| 0.01 | $\leq b \leq$ | 0.1 |
| 0.001 | $\leq c \leq$ | 0.01 | and Fe is present as $Fe_2O_3$ in the end product.

2. Dielectric material according to claim 1, wherein the parameters satisfy the following inequalities:

| | | |
|---|---|---|
| 0.99 | $\leq t \leq$ | 1.01 |
| 0.30 | $\leq x \leq$ | 0.38 |
| 0.06 | $\leq y \leq$ | 0.70 |
| 0.015 | $\leq a \leq$ | 0.06 |
| 0.01 | $\leq b \leq$ | 0.01 |
| 0.001 | $\leq c \leq$ | 0.01 |

3. Dielectric material according to claim 1, wherein the composition of the raw materials in respect of 1.003 mole of $TiO_2$ is as follows:

| | |
|---|---|
| 0.325 | $SnO_2$ |
| 0.642 | $ZrO_2$ |
| 0.03 | NiO |
| 0.015 | $La_2O_3$ |
| 0.0035 | Fe |

4. Dielectric material according to claim 1, wherein the composition of raw materials in respect of 1.001 mole of $TiO_2$ is as follows:

| | |
|---|---|
| 0.325 | $SnO_2$ |
| 0.644 | $ZrO_2$ |
| 0.03 | NiO |
| 0.015 | $La_2O_3$ |
| 0.0035 | Fe |

5. A method of manufacture of dielectric material according to claim 1, wherein said method comprises at least one step which involves grinding of raw materials and one step which involves sintering in an oxidizing atmosphere at a temperature of 1400° C. to 1500° C.

6. A method of manufacture according to claim 5, wherein iron is introduced during the grinding step by employing steel grinding equipment.

7. A method of manufacture according to claim 6, wherein the grinding step is carried out by making use of steel balls 3 mm in diameter during a period of twenty minutes.

8. A method of manufacture according to claim 6, wherein the sintering step is carried out in an atmosphere of pure oxygen during a period of six hours at a temperature within the range of 1400° C. to 1500° C.

* * * * *